US012651187B2

(12) United States Patent
Möttönen et al.

(10) Patent No.: US 12,651,187 B2
(45) Date of Patent: Jun. 9, 2026

(54) QUBIT RESET

(71) Applicant: IQM FINLAND OY, Espoo (FI)

(72) Inventors: Mikko Möttönen, Espoo (FI); Jani Tuorila, Espoo (FI)

(73) Assignee: IQM FINLAND OY, Espoo (FI)

( * ) Notice: Subject to any disclaimer, the term of this patent is extended or adjusted under 35 U.S.C. 154(b) by 386 days.

(21) Appl. No.: 18/563,048

(22) PCT Filed: Jun. 28, 2021

(86) PCT No.: PCT/FI2021/050500
§ 371 (c)(1),
(2) Date: Nov. 21, 2023

(87) PCT Pub. No.: WO2023/275426
PCT Pub. Date: Jan. 5, 2023

(65) Prior Publication Data
US 2024/0242103 A1     Jul. 18, 2024

(51) Int. Cl.
*G06N 10/40*          (2022.01)
(52) U.S. Cl.
CPC .................................... *G06N 10/40* (2022.01)
(58) Field of Classification Search
CPC ......... G06N 10/40; G06N 10/20; H10N 60/12
See application file for complete search history.

(56) References Cited

U.S. PATENT DOCUMENTS 10,354,198 B1 * 7/2019 Filipp ................... H10N 60/805
10,467,544 B2 * 11/2019 Filipp ................... G06N 10/40

10,749,096 B2 * 8/2020 Przybysz ............... G06N 10/40
11,183,989 B1 * 11/2021 Thorbeck ............... G06N 10/40
11,456,741 B2 * 9/2022 Ahonen ........... H03K 19/00346
12,001,919 B1 * 6/2024 Putterman ............. G06N 10/40
(Continued)

FOREIGN PATENT DOCUMENTS

CN          213024477 U       4/2021

OTHER PUBLICATIONS

Basilewitsch et al., Reservoir engineering using quntum optimal control for qubit reset, New Journal of Physics, vol. 21, No. 9, 2019, 13 pages.

(Continued)

*Primary Examiner* — Ibrahim A Khan
(74) *Attorney, Agent, or Firm* — Meunier Carlin & Curfman LLC

(57)          ABSTRACT

It is an objective to provide an arrangement for resetting at least one qubit. According to an embodiment, an arrangement for resetting at least one qubit comprises at least one qubit; an energy dissipation structure selectively couplable to the at least one qubit; and a control unit, configured to reset the at least one qubit by performing: couple the at least one qubit to the energy dissipation structure for a reset period using a control signal, wherein the control signal controls a coupling strength between the at least one qubit and the energy dissipation structure; and after the reset period, decouple the at least one qubit from the energy dissipation structure during a decoupling period using the control signal, wherein the coupling strength comprises, during the decoupling period, at least a temporally linearly decreasing component and at least one temporally sinusoidal component.

16 Claims, 2 Drawing Sheets

(56) References Cited

U.S. PATENT DOCUMENTS

| | | | |
|---|---|---|---|
| 2017/0116542 A1* | 4/2017 | Shim ...................... | H10N 60/12 |
| 2017/0193388 A1* | 7/2017 | Filipp ................... | G06N 10/40 |
| 2019/0237648 A1* | 8/2019 | Przybysz .............. | G06N 10/40 |
| 2021/0406750 A1* | 12/2021 | Li .......................... | G06N 10/40 |
| 2022/0399145 A1* | 12/2022 | Kirichenko ............ | H01F 6/006 |
| 2023/0142623 A1* | 5/2023 | Leroux ................. | G06N 10/20 |
| | | | 712/25 |
| 2025/0200411 A1* | 6/2025 | Miao ...................... | G06N 10/70 |

OTHER PUBLICATIONS

Sevriuk et al., Fast control of dissipation in a superconducting resonator, Applied Physics Letters, vol. 115, No. 8, 2019, 4 pages.
International Search Report and Written Opinion issued in PCT/FI2021/050500, mailed Mar. 18, 2022.

* cited by examiner 102
304
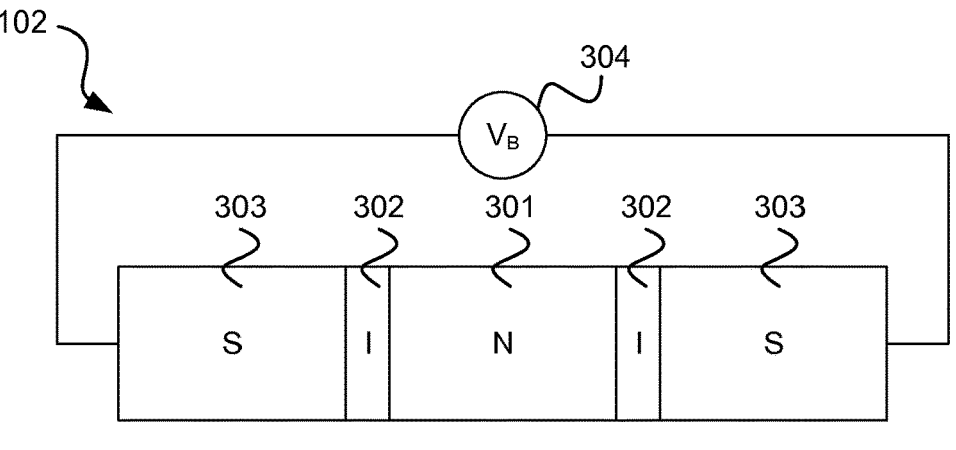
FIG. 3
103
Processor ↔ Memory
401
402
FIG. 4
500
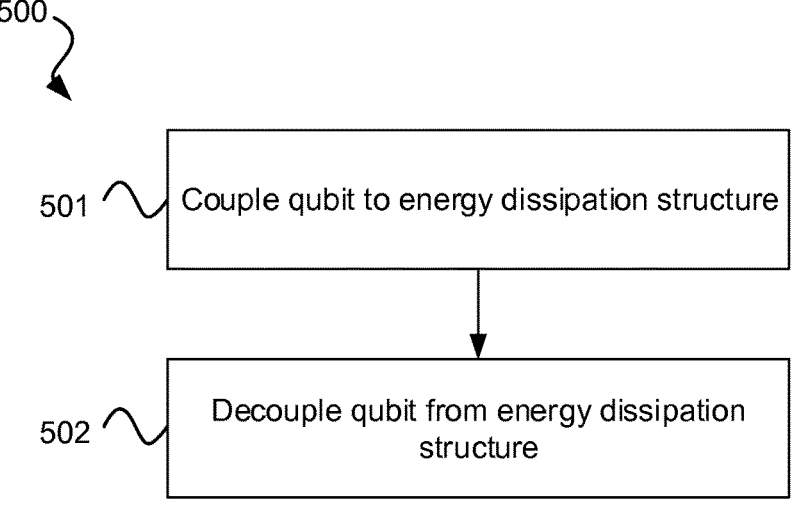
501 Couple qubit to energy dissipation structure
502 Decouple qubit from energy dissipation structure
FIG. 5

QUBIT RESET

CROSS REFERENCE TO RELATED APPLICATIONS

The application is a U.S. National Stage application filed under 35 U.S.C. § 371 of PCT/FI2021/050500, filed on Jun. 28, 2021.

TECHNICAL FIELD

The present disclosure relates to quantum computing, and more particularly to an arrangement for resetting at least one qubit, to a method for resetting at least one qubit, and to a quantum computing system.

BACKGROUND

The ability to reset qubits fast and with high fidelity is one of the prerequisites for coherent quantum computations. In superconducting realizations, for example, experimental developments have been obtained recently with approaches based on Purcell-filtered cavities, feedback-based schemes, and unconditional all-microwave protocols. However, reset fidelities above 99% required by quantum-error correction schemes remain a technological challenge in the 10 nanosecond time scales required by the coherent operation of the qubits.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective to provide an arrangement for resetting at least one qubit, a method for resetting at least one qubit, and a quantum computing system. The foregoing and other objectives are achieved by the features of the independent claims. Further implementation forms are apparent from the dependent claims, the description and the figures.

According to a first aspect, an arrangement for resetting at least one qubit comprises: at least one qubit; an energy dissipation structure selectively couplable to the at least one qubit, wherein the energy dissipation structure is configured to dissipate energy transferred to the energy dissipation structure from the at least one qubit; and a control unit, configured to reset the at least one qubit by performing: couple the at least one qubit to the energy dissipation structure for a reset period using a control signal, wherein the control signal controls a coupling strength between the at least one qubit and the energy dissipation structure; and after the reset period, decouple the at least one qubit from the energy dissipation structure during a decoupling period using the control signal, wherein the coupling strength between the at least one qubit and the energy dissipation structure comprises, during the decoupling period, at least a temporally linearly decreasing component and at least one temporally sinusoidal component. The arrangement can, for example, reset the at least one qubit with reduced initialization errors.

In an implementation form of the first aspect, the coupling strength between the at least one qubit and the energy dissipation structure further comprises, during the decoupling period, a plurality of temporally sinusoidal components, wherein a period of each temporally sinusoidal component is less than or equal to a temporal length of the decoupling period. The arrangement can, for example, with such a coupling strength, smoothly decouple the at least one qubit and the energy dissipation structure.

In another implementation form of the first aspect, the period of an lth sinusoidal component in the plurality of temporally sinusoidal components is $\tau/l$, wherein $\tau$ is the temporal length of the decoupling period. The arrangement can, for example, with such a coupling strength, ensure that the sinusoidal components are such that initialization errors are reduced.

In another implementation form of the first aspect, the temporally linearly decreasing component decreases from a maximum value to substantially zero during the decoupling period. The arrangement can, for example, with such a coupling strength, make the coupling go to substantially zero at the end of the decoupling period.

In another implementation form of the first aspect, each sinusoidal component in the plurality of temporally sinusoidal components is substantially zero at a start of the decoupling period and substantially zero at an end of the decoupling period. The arrangement can, for example, with such a coupling strength, ensure that the sinusoidal components are such that initialization errors are reduced.

In another implementation form of the first aspect, a time derivative of the coupling strength between the at least one qubit and the energy dissipation structure is substantially zero at a start of the decoupling period and at an end of the decoupling period. The arrangement can, for example, with such a coupling strength, ensure that the decoupling is smooth at the start and at the end of the decoupling period, which can reduce initialization errors.

In another implementation form of the first aspect, the coupling strength between the at least one qubit and the energy dissipation structure is temporally strictly decreasing during the decoupling period. The arrangement can, for example, with such a coupling strength, reduce the temporal length of the decoupling period, and thus make the resetting of the at least one qubit faster.

In another implementation form of the first aspect, the energy dissipation structure comprises at least one normal metal-insulator-superconductor, NIS, junction. The arrangement can, for example, utilise the NIS junction for efficient and controllable energy dissipation.

In another implementation form of the first aspect, the energy dissipation structure comprises a quantum circuit refrigerator, QCR, wherein the QCR comprises a voltage-biased superconductor-insulator-normal metal-insulator-superconductor, SINIS, junction, and wherein the at least one qubit is electrically coupled to the normal metal of the SINIS junction of the energy dissipation structure. The arrangement can, for example, utilise the SINIS junction for efficient and controllable energy dissipation.

In another implementation form of the first aspect, the control unit is configured to control the coupling strength between the at least one qubit and the energy dissipation structure by tuning a bias voltage of the SINIS junction of the energy dissipation structure based on the control signal. The arrangement can, for example, efficiently control the coupling via the bias voltage.

In another implementation form of the first aspect, the energy dissipation structure is configured to dissipate photon energy transferred to the energy dissipation structure via photon-assisted electron tunnelling in the NIS/SINIS junction. The arrangement can, for example, efficiently dissipate the transferred energy via the photon-assisted electron tunnelling.

In another implementation form of the first aspect, the at least one qubit comprises at least one superconductive qubit.

In another implementation form of the first aspect, the control unit is further configured, after the reset period and before the decoupling period, perform a pre-decoupling using the control signal, wherein a magnitude of a time derivative of the coupling strength between the at least one qubit and the energy dissipation structure during the pre-decoupling is less than a magnitude of a time derivative of the coupling strength between the at least one qubit and the energy dissipation structure during the decoupling period. The arrangement can, for example, further reduce initialization errors via the pre-decoupling.

According to a second aspect, a quantum computing system comprises a plurality of arrangements according to the first aspect.

According to a third aspect, a method for resetting at least one qubit using an energy dissipation structure selectively couplable to the at least one qubit, wherein the energy dissipation structure is configured to dissipate energy transferred to the energy dissipation structure from the at least one qubit, the method comprises: coupling the at least one qubit to the energy dissipation structure for a reset period using a control signal, wherein the control signal controls a coupling strength between the at least one qubit and the energy dissipation structure; and after the reset period, decoupling the at least one qubit from the energy dissipation structure during a decoupling period using the control signal, wherein the coupling strength between the at least one qubit and the energy dissipation structure comprises, during the decoupling period, at least a temporally linearly decreasing component and at least one temporally sinusoidal component.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which:

FIG. 3 illustrates a schematic representation an energy dissipation structure comprising a superconductor-insulator-normal metal-insulator-superconductor junction according to an embodiment;

FIG. 4 illustrates a schematic representation of a control unit according to an embodiment; and FIG. 5 illustrates a flow chart representation of a method for resetting at least one qubit according to an embodiment.

In the following, like reference numerals are used to designate like parts in the accompanying drawings.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
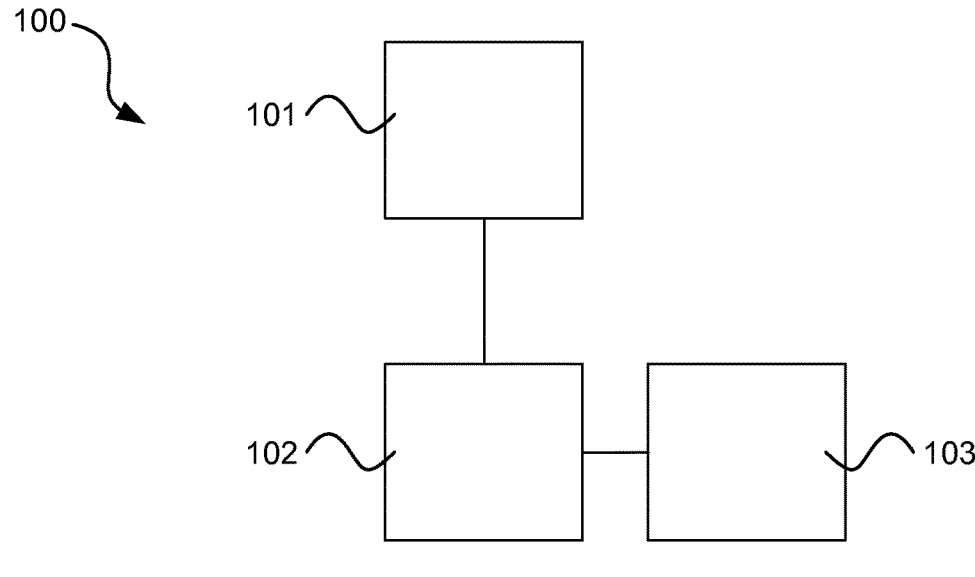
FIG. 1 illustrates a schematic representation of an arrangement for resetting at least one qubit according to an embodiment.

FIG. 1 illustrates a schematic representation of an arrangement for resetting at least one qubit according to an embodiment.

According to an embodiment, the arrangement 100 comprises at least one qubit 101.

The at least one qubit 101 may have a ground state $|g\rangle$. Herein, the ground state may refer to a quantum state of the qubit with the lowest energy.

The at least one qubit 101 may further have at least one excited state. The at least one excited state may comprise a lowest excited state $|e\rangle$. Herein, the lowest excited state may refer to a quantum state of the qubit with the second lowest energy.

The ground state and the lowest excited state of a qubit may correspond to the computational basis of the qubit. For example, the ground state $|g\rangle$ may correspond to the $|0\rangle$ state of the qubit and the lowest excited state $|e\rangle$ may correspond to the $|1\rangle$ state of the qubit or vice versa. Other quantum states of a qubit may be referred to as non-computational states.

The energy gap between the ground state and the lowest excited state may correspond to a resonance frequency of the qubit. The energy gap may also be referred to as the qubit energy, and the corresponding frequency as the qubit frequency.

Herein, resetting a qubit may refer to the act of transitioning a qubit to a pure quantum state, typically the ground state, after, for example, a quantum computation. Resetting a qubit may also be referred to as initializing the qubit.

The arrangement 100 may further comprise an energy dissipation structure 102 selectively couplable to the at least one qubit 101. The energy dissipation structure 102 may be configured to dissipate energy transferred to the energy dissipation structure from the at least one qubit.

The energy dissipation structure 102 may also be referred to as an energy relaxation structure, a controllable an environment, a controllable energy dissipation structure, an engineered environment, a bath, a dissipation source, or similar.

The arrangement 100 may further comprise a control unit 103 configured to reset the at least one qubit by performing: couple the at least one qubit to the energy dissipation structure for a reset period using a control signal, wherein the control signal controls a coupling strength between the at least one qubit and the energy dissipation structure, and after the reset period, decouple the at least one qubit from the energy dissipation structure during a decoupling period using the control signal, wherein the coupling strength between the at least one qubit and the energy dissipation structure comprises, during the decoupling period, at least a temporally linearly decreasing component and at least one temporally sinusoidal component.

The control signal may also be referred to as a control voltage, a control pulse, a bias voltage, junction bias voltage, or similar.

The coupling strength between the at least one qubit and the energy dissipation structure may also be referred to as coupling strength, decoupling protocol, relaxation rate, or similar.

In some embodiments, the control signal may directly control the coupling strength between the at least one qubit and the energy dissipation structure. For example, the coupling strength between the at least one qubit and the energy dissipation structure may be linearly dependent on the control signal. In other embodiments, the control signal may control the coupling strength between the at least one qubit and the energy dissipation structure indirectly. For example, the control signal may be a radio frequency (RF) signal and the coupling strength between the at least one qubit and the energy dissipation structure may depend on the control signal in some non-linear fashion.

Although some embodiments and analysis disclosed herein may refer to specific implementations of the energy dissipation structure 102, it should be appreciated that the energy dissipation structure 102 may be implemented using, for example, any energy dissipation structure with a coupling to the at least one qubit 101.

The energy dissipation structure 102 may be electromagnetically coupled to the at least one qubit 101.

Herein, when two elements are electromagnetically coupled, the elements may have an electromagnetic connection between each other. The electromagnetic connection may comprise any number of electrical components/elements, such as capacitors, inductors, mutual inductances, transmission lines etc.

It should be appreciated that although the at least one qubit 101 and the energy dissipation structure 102 may be electromagnetically coupled continuously, the relaxation rate of the qubit 101 as inflicted by the energy dissipation structure 102 may still be selective, if the properties of the relaxation structure 102 can be controlled. The effect of the control signal can, for example, be such that when the control signal is applied photon-assisted tunnelling in the energy dissipation structure 102 becomes energetically favourable with photon energies corresponding to the difference of the energies of the excited and ground states of the qubit 101. In some embodiments, when the control signal is not applied, the photon assisted tunnelling is highly unlikely irrespective of the state of the at least one qubit 101.

Herein, when the properties of the energy dissipation structure 102 are controllable, the strength of interaction between the energy dissipation structure 102 and other objects may be controlled and/or turned on or off. It should be appreciated that even if there is a continuous connection, such as an electrical/capacitive/inductive connection, between two elements, the interaction between the elements can be tuned.

According to an embodiment, the at least one qubit 101 comprises at least one superconductive qubit.

According to an embodiment, the at least one qubit 101 comprises at least one Josephson junction.

According to an embodiment, the at least one qubit 101 comprises a transmon qubit. Alternatively, the at least one qubit 101 may comprise any other type of qubit, such as, a flux qubit, a charge qubit, a phase qubit, or a fluxonium qubit.

Although some embodiments may be disclosed herein with reference to a certain type of qubit, these qubit types are only exemplarily. In any embodiment disclosed herein, the at least one qubit 101 may be implemented in various ways and using various technologies.

The arrangement 100 may be embodied in, for example, a quantum computing device. Such a quantum computing device may comprise a plurality of qubits for performing quantum computation. Each such qubit may be implemented using the arrangement 100.

The arrangement 100 may be realized, for example, in a superconducting circuit architecture.

When the arrangement 100 is operational, the at least one qubit 101 and the energy dissipation structure 102 may be physically located in a cryostat or similar. The cryostat may cool the at least one qubit 101 and other components of the arrangement 100, such as the energy dissipation structure 102, to cryogenic temperatures. This may be required if the at least one qubit 101 correspond to, for example, a super-conductive qubit.

The following analysis searches for an optimized protocol for decoupling the at least one qubit 101 from initially strongly-coupled energy dissipation structure 102, which can be considered a low-temperature bath. The energy dissipation structure 102 may be realized with, for example, a quantum-circuit refrigerator (QCR).

The fidelity of the protocol can be quantified as the leakage to the excited qubit states, i.e. $l(t)=1-\rho_g(t)$, where $\rho_g$ is the ground-state occupation of the at least one qubit 101. Due to the strong coupling, the steady state of the at least one qubit 101 is determined by entanglement with the energy dissipation structure 102, and can be expressed as $$\rho_e^{\infty} = \langle e|\rho(t \to \infty)|e\rangle = \frac{\kappa}{2\pi\omega_q}\left[-1 - \gamma + \ln\left(\omega_c/\omega_q\right)\right] = A\kappa$$

where $\kappa$ is the zero-temperature qubit relaxation rate in the Born-Markov approximation, $\omega_q$ is the qubit angular frequency, $\gamma=0.577\ldots$ is the Euler constant, $\omega_c \gg \omega_q$ is the cut-off frequency of the bath, and $A=[-1-\gamma+\ln(\omega_c/\omega q)]/(2\pi\omega_q)$. If one neglects the direct in influence of the changing $\kappa(t)$ to the system, the dynamics of the at least one qubit 101 can be solved from the equation of motion $$\frac{d\rho_e}{dt} = \kappa(t)[A\kappa(t) - \rho_e(t)],$$

which describes relaxation of the at least one qubit 101 towards the entangled steady state under time-dependent coupling strength $\kappa(t)$.

The relaxation process determined by the equation above can be optimized by maximizing the relaxation rate at each instant in time with respect to $\kappa$. Thus, by setting $$\frac{d}{d\kappa}d\rho_e/dt = 0,$$

one obtains $$\kappa = \frac{\rho_e}{2A}.$$

Replacing this into the equation of motion above, one obtains $$\dot{\rho}_e = -\frac{\rho_e^2}{4A}$$

One can then separate the variables, and obtain $$\frac{d\rho}{\rho^2} = -\frac{dt}{4A}.$$

After integration, one obtains the solution $$\rho_e(t) = \frac{4A}{t + 4A\rho_e(0)},$$

where $\rho_e(0)$ is the initial condition for the density operator. Using the aforementioned equation $\kappa = \rho_e/(2A)$, one obtains the protocol for the relaxation rate to be $$\kappa(t) = \kappa_{max}\frac{1}{1 + \kappa_{max}t/2},$$

where $\kappa_{max}$ is the initial (strong) relaxation rate. Independent on the realization of the energy dissipation structure 102, there exists a minimum value of the dissipation rate, denoted with $\kappa_{min}$. This sets the lower limit for the achievable initialization error for the above protocol. It may be beneficial to minimize excited state occupation of the at least one qubit 101 by tuning the relaxation rate $\kappa$ to as low value as possible with the energy dissipation structure 102, denoted with $\kappa_{min} \ll \kappa_{max}$. Such value can be reached with the above protocol in time given by $$\tau_1 \approx 2\kappa_{min}^{-1}.$$

Consequently, the minimal initialization error is given as $$\rho_e^{min} = \rho_e(\tau_1) = 2A\kappa_{min}$$

which is twice the limiting value set by the qubit-bath correlations. Since the above result is obtained by maximizing the relaxation rate at all times, one can conclude that, in order to reach the correlation limited initialization error, the protocol duration should be longer than $\tau_1$.

One can extract the minimum total dissipation/relaxation rate by measuring the relaxation time of the at least one qubit 101. However, the relaxation rate depends on the coupling to the energy dissipation structure 102 and also on internal sources of relaxation that may not be controllable. It may not be possible to separate these sources in the measurement. In the ideal case, the relaxation rate caused by the energy dissipation structure 102 is the only source of relaxation. However, since $$\kappa_{min}^{-1}$$

should be of the order of, or preferably smaller than, the intrinsic decoherence time of the at least one qubit 101, even the above value $\tau_1$ for the protocol duration $\tau$ may be too large for use in fast, high-fidelity initialization. Moreover, a sweep to $\kappa_{min}$ that is faster than that given by $\kappa(t)$ above can lead to a larger initialization error than given above since, for such sweep protocols, the relaxation rate from the excited states is not maximized and the duration of the sweep is shorter than in the optimized case. This is referred to as the decoupling error, which results into a trade-off between the reset speed and fidelity. Such error can still be below the error-correction threshold if the value of $\kappa_{min}$ is low enough. This suggests that the protocol for $\kappa(t)$ above should be modified with a fast decoupling starting at time $t \ll \tau_1$. Herein, this is referred to as forced decoupling.

For analysis, let us assume that initially the system of the at least one qubit 101 and the energy dissipation structure 102 is in an initial state $\hat{\rho}(0) = \hat{\rho}_0$. This may be the result of a pre-initialization process realized with the decoupling scheme given by the relaxation rate $\kappa(t)$ above. Such a process can be slow and, thus, one can apply forced decoupling for a fixed time interval $$t : 0 \to \tau < 2\kappa_{min}^{-1}.$$

Here, the zero of time has been shifted to the instant at which the forced decoupling starts. Within this interval, one can search for such a protocol $\kappa(t)$: $\kappa_{max} \to \kappa_{min}$ that minimizes the excited-state occupation $\rho_e(t)$ at the end of the protocol.

The full model for the qubit dissipation consists of the Hamiltonian $$\hat{H} = \hbar\omega_q\hat{\sigma}_+\hat{\sigma}_- + \hbar\sum_k \omega_k\hat{a}_k^\dagger\hat{a}_k + \hbar(\hat{\sigma}_+ + \hat{\sigma}_-)\sum_k g_k[\hat{a}_k^\dagger + \hat{a}_k] \approx$$
$$\hbar\omega_q\hat{\sigma}_+\hat{\sigma}_- + \hbar\sum_k \omega_k\hat{a}_k^\dagger\hat{a}_k + \hbar\sum_k g_k(\hat{\sigma}_+\hat{a}_k^\dagger + \hat{\sigma}_-\hat{a}_k).$$

Here, the system of the at least one qubit 101 and the energy dissipation structure 102 is modelled as a qubit with angular frequency $\omega_g$ coupled to a bath of oscillators with angular frequencies $\omega_k$. The coupling angular frequencies between the qubit and the oscillators are given by $g_k$. The ground state can be found analytically by neglecting the co-rotating terms from the Hamiltonian. If the couplings are weak, one can diagonalize the system approximatively in second order in $g_k$ with the transformation $$\hat{U} = \exp\left(\sum_k \hat{S}_k\right),$$

where $$\hat{S}_k = [g_k/(\omega_q + \omega_k)](\hat{a}_k^\dagger\hat{\sigma}_+ - \hat{a}_k\hat{\sigma}_-).$$

Here, the coupling coefficients $g_k$ are time-dependent and, as a consequence, the transformation is time-dependent. Thus, the transformed Hamiltonian can be written as $$\tilde{H} = \hat{U}\hat{H}\hat{U}^\dagger + i\hbar\dot{\hat{U}}\hat{U}^\dagger \approx -\frac{\hbar\omega_q}{2}\hat{\sigma}_z + \hbar\sum_k \omega_k \hat{a}_k^\dagger \hat{a}_k +$$

$$\frac{\hbar}{2}\sum_{k,l}\frac{g_k g_l}{\omega_q + \omega_k}\left[\hat{\sigma}_+\hat{\sigma}_-\left(\hat{a}_k^\dagger \hat{a}_l + \hat{a}_l^\dagger \hat{a}_k\right) - \hat{\sigma}_-\hat{\sigma}_+\left(\hat{a}_l \hat{a}_k^\dagger + \hat{a}_k \hat{a}_l^\dagger\right)\right] +$$

$$i\hbar\sum_k \frac{\dot{g}_k}{\omega_q + \omega_k}\left(\hat{a}_k^\dagger \hat{\sigma}_+ - \hat{a}_k\hat{\sigma}_-\right) \approx \hbar\tilde{\omega}_q\hat{\sigma}_+\hat{\sigma}_- + \hbar\sum_k \tilde{\omega}_k \hat{a}_k^\dagger \hat{a}_k +$$

$$\hbar\sum_k \frac{2g_k^2}{\omega_q + \omega_k}\hat{\sigma}_+\hat{\sigma}_-\hat{a}_k^\dagger \hat{a}_k + i\hbar\sum_k \frac{\dot{g}_k}{\omega_q + \omega_k}\left(\hat{a}_k^\dagger \hat{\sigma}_+ - \hat{a}_k\hat{\sigma}_-\right),$$

where $$\tilde{\omega}_q = \omega_q + \sum_k g_k^2/(\omega_q + \omega_k) \text{ and } \tilde{\omega}_k = \omega_k - g_k^2/(\omega_q + \omega_k).$$

In the third equality, it has been assumed that the system starts from the adiabatic ground state and, thus, the dominating term inducing transitions between the adiabatic states is the latter one. Thus, we have neglected the terms that induce transitions between the oscillators.

The protocol may be such that, in the first phase, the decoupling κ(t) disclosed above is used to relax the at least one qubit 101 quickly near to the steady state. Thus, after the fast relaxation phase, the qubit-bath system should be close to its adiabatic ground state. Then, one can apply a rotation that decouples the at least one qubit 101 from the energy dissipation structure 102. It may be beneficial to have such a decoupling that transitions from the adiabatic ground state are minimized. This can be obtained with a protocol during which the system is diagonal in the so-called first super-adiabatic eigenbasis. This is equivalent to the requirement that $\dot{g}_k$ are constant, i.e., that the couplings $g_k$ depend linearly on time.

Based on the above, it is assumed here that the system starts in the adiabatic ground state $|\psi(0)\rangle = |g, 0\rangle$ ). Here, the notation is such that the first index gives the state of the qubit and the second index represents the total occupation number of the oscillators. Hamiltonian in disclose above shows that the adiabatic ground state is coupled to the two-excitation states of the form $|e, 1_k\rangle$ , where k labels the oscillator with a single excitation with all other oscillators in their ground states. Moreover, the oscillators are mutually decoupled.

One can consider the case with a single oscillator. The full model for the qubit decay consists of the Hamiltonian $$\hat{H} = \hbar\omega_q\hat{\sigma}_+\hat{\sigma}_- + \hbar\sum_k \omega_k \hat{a}_k^\dagger \hat{a}_k + \hbar(\hat{\sigma}_+ + \hat{\sigma}_-)\sum_k g_k\left[\hat{a}_k^\dagger + \hat{a}_k\right]$$

where a qubit with angular frequency $\omega_q$ is coupled to a bath of oscillators with angular frequencies $\omega_k$. The coupling frequencies between the qubit and the oscillators are given by $g_k$. Here, one can consider the interaction between the qubit and one of the oscillators. Consequently, the Hamiltonian operator can be written as $$\hat{H}_{kr} = \hbar\omega_q\hat{\sigma}_+\hat{\sigma}_- + \hbar\omega_k \hat{a}^\dagger\hat{a} + \hbar g_k(\hat{\sigma}_+ + \hat{\sigma}_-)\left[\hat{a}^\dagger + \hat{a}\right].$$

One can consider a situation in which the system starts from the ground state of the above Hamiltonian. This corresponds to the thermal state of the qubit-bath system at zero temperature. If $g_k/\omega_q \ll 1$ the ground state is effectively a superposition of the states $|g, 0\rangle$ and $|e, 1_k\rangle$ . One can, therefore, truncate the above Hamiltonian into the subspace spanned by these two states. As a consequence, the Hamiltonian operator can be written as $$\hat{H}_k(t) = \frac{\hbar}{2}(\omega_q + \omega_k)\hat{\sigma}_z + \hbar g_k(t)\hat{\sigma}_x = H_z\hat{\sigma}_z + H_x(t)\hat{\sigma}_x,$$

where $\hat{\sigma}_z = |e, 1\rangle\langle e, 1| - |g, 0\rangle\langle g, 0|$, $\hat{\sigma}_x = (|e, 1\rangle\langle g, 0| + |g, 0\rangle\langle e, 1|)$, and $H_x(t) = \hbar h g_k$ and $\hat{H}_z = \hbar h(\omega_q + \omega_k)/2$. One can make a transformation into the adiabatic basis using the time-dependent unitary operator $$\hat{U}_k = \begin{pmatrix} \cos(\phi_k/2) & \sin(\phi_k/2) \\ -\sin(\phi_k/2) & \cos(\phi_k/2) \end{pmatrix},$$

where $$\phi_k(t) = \arctan\left(\frac{H_{x(t)}}{H_z}\right).$$

As a consequence, the effective Hamiltonian can be written as $$\hat{H}_{eff}(t) = \hat{U}\hat{H}_k\hat{U}^\dagger + i\hbar\dot{\hat{U}}\hat{U}^\dagger = \frac{\hbar}{2}\omega(t)\hat{\sigma}_z - \frac{\hbar\dot{\phi}_k}{2}\hat{\sigma}_y,$$

where $$\hbar\omega(t) = 2\sqrt{H_x^2(t) + H_z^2},$$

$\hat{\sigma}_z = |+\rangle\langle +| - |-\rangle\langle -|$, $\hat{\sigma}_y = i(|+\rangle\langle -| - |-\rangle\langle +|)$, and $|\pm\rangle$ are the instantaneous eigenstates of the Hamiltonian $H_k(t)$ above.

If the state vector points along the Hamiltonian vector during the whole dynamics, the process is called adiabatic. However, one may wish to minimize the non-adiabatic occupation at the end of the dynamics. Therefore, one can consider the state vector $$|\psi(t)\rangle = \alpha(t)|+\rangle + \beta(t)|-\rangle,$$

represented in the adiabatic basis. One can try to minimize the error defined at t=τ as $$\epsilon_k = |\alpha(\tau)|^2,$$

where τ is the duration of the sweep. The time-dependent Schrödinger equation for the Hamiltonian $H_{eff}(t)$ above can be written as $$\dot{\alpha} = -\frac{i\omega}{2}\alpha + \frac{\dot{\phi}_k}{2}\beta$$

$$\dot{\beta} = \frac{i\omega}{2}\beta - \frac{\dot{\phi}}{2}\alpha.$$

Since $|\alpha|^2 - |\beta|^2 = 1 - 4|\alpha^*\beta|^2$, one obtains $$\frac{d}{dt}\alpha^*\beta = i\alpha^*\beta + \frac{\dot{\phi}_k}{2}\sqrt{1 - 4|\alpha^*\beta|^2},$$

where the sign of the last term should be changed if $|\alpha|^2 > |\beta|^2$. On the Bloch sphere, one can write $\beta = \cos(\theta/2)$ and $\alpha = \sin(\theta/2)\exp(i\varphi)$. Consequently, one obtains $$\frac{d}{dt}\left[\sin\theta e^{-i\varphi}\right] = i\omega\sin\theta e^{-i\varphi} + \dot{\phi}_k\cos\theta.$$

One can define $\varphi = \varphi' - \int dt\,\omega(t)$. Assuming that initially the system is in the adiabatic ground state with $\alpha(0) = 0$ and $\beta(0) = 1$, one obtains through time integration from 0 to $\tau$ that $$\sin\theta e^{-i\varphi'} = \int_0^\tau dt\,\dot{\phi}_k(t)\cos\theta(t)e^{-i\int_0^t dt'\,\omega(t')}.$$

Here, one can make some simplifying approximations. One can assume that the coupling with the oscillators is weak such that $\omega(t) \approx \omega_q + \omega_k$. In addition, one can look for a solution that causes small deviations from the adiabatic solution. This means that we make an approximation that $\sin\theta \approx \theta$ and $\cos\theta \approx 1$. As a consequence, one can obtain that $$\theta e^{-i\varphi'} = \int_0^\tau dt\,\dot{\phi}_k(t)e^{-i(\omega_q + \omega_k)t}.$$

This implies that the error, i.e. the occupation in the excited adiabatic state, can be written as $$\epsilon_k = |\alpha|^2 \approx \frac{\theta^2}{4} \approx \frac{1}{4}\left|\int_0^\tau dt\,\dot{\phi}_k(t)e^{-i(\omega_q + \omega_k)t}\right|^2 = \frac{1}{4}S_{d\phi_k/dt}(\omega_q + \omega_k).$$

This means that the error of the qubit-oscillator system is given by the power spectrum of the coupling strength evaluated at the resonance frequency $\omega_q + \omega_k$. One can try to minimize the total error $\epsilon = \sum_k \epsilon_k$. However, since the oscillators are assumed independent, it is enough to minimize the errors from each individual oscillator. The solution is the so-called Slepian function. However, the Slepian function does not go to zero in the beginning and in the end of the pulse, which is may be desirable in the current case. Functions with such boundary conditions can be quite generally approximated to a good accuracy by couple of first terms from the ansatz $$\dot{\phi}_k = \sum_{l=1}^{l_{max}} \lambda_l[1 - \cos(2\pi l t/\tau)].$$

The values $\lambda_l$ are constrained by $$\phi_k(\tau) - \phi_k(0) = \tau\sum_l \lambda_l$$

which is obtained by integration of the ansatz.

Plugging this into the equation for $\epsilon_k$ above, one obtains $$\epsilon_k = \frac{1}{4}\left|\frac{1 - \cos[(\omega_q + \omega_k)\tau] + i\sin[(\omega_k + \omega_k)\tau]}{\omega_q + \omega_k}\sum_l \lambda_l \frac{1}{1 - (\omega_q + \omega_k)^2\tau^2/4(4\pi^2 l^2)}\right|^2.$$

For typical experimental parameters, $\omega_q/(2\pi) = 5$ GHz and $\tau \approx 10$ ns. Consequently, if $l \leq 5$, one obtains that $4\pi^2 l^2 << (\omega_q + \omega_k)\tau$. Thus, $$\epsilon_k = \frac{1}{4}\left|4\pi^2 \frac{1 - \cos[(\omega_q + \omega_k)\tau] + i\sin[(\omega_k + \omega_k)\tau]}{(\omega_q + \omega_k)^3\tau^2}\sum_{l=1}^{l_{max}} l^2\lambda_l\right|^2,$$

where $l_{max} \leq 5$. For an arbitrary $\tau$ and $\omega_k$, $\epsilon_k$ is zero if $$\sum_l l^2\lambda_l = 0.$$

One can recall here the constraint $$\sum_l \lambda_l = \frac{\phi_k(\tau) - \phi_k(0)}{\tau}.$$

Thus, these two equations can determine the situation if $l_{max} = 2$. For larger truncations with $l_{max} > 2$, one has $l_{max} - 2$ free parameters that can be used to optimize the drive signal.

The coupling frequency to oscillator $k$ can be, thus, written as $$g_k(t) = g_k(0) + \frac{\omega_q + \omega_k}{2}\sum_l \lambda_l\left[t - \frac{\tau}{2\pi l}\sin(2\pi l t/\tau)\right].$$

For simplicity, one can assume here that the coupling $g_k(\tau) = 0$. Therefore, one obtains the constraint $$\tau\sum_l \lambda_l = -\frac{2g_k(0)}{\omega_q + \omega_k}.$$

Thus, with the change of parameters $\bar{\gamma}_l = (\omega_q + \omega_k)/[2g_k(0)]\gamma_l$, one can obtain $$g_k(t) = g_k(0)\left\{1 + \sum_l \bar{\lambda}_l\left[t - \frac{\tau}{2\pi l}\sin\left(\frac{2\pi l t}{\tau}\right)\right]\right\} = f_k(t)g_k(0),$$

with the constraints $$\tau \sum_l \overline{\lambda}_l = -1$$

and $$\sum_l l^2 \overline{\lambda}_l = 0.$$

One can define the decoupling protocol for a single oscillator as $$f(t) = 1 + \sum_l \overline{\lambda}_l \left[ t - \frac{\tau}{2\pi l} \sin\left(\frac{2\pi l t}{\tau}\right) \right].$$

In principle, the decoupling protocol could be different for each bath oscillator. However, here it is assumed that each oscillator is decoupled with the same protocol f(t).

One can make the connection between the decoupling rate f(t) for the oscillators, and the effective decay rate of the qubit. Consequently, one can derive the Lindblad equation for time-dependent coupling frequencies between a qubit and the bath oscillators. Once can model the situation with the Hamiltonian $$\hat{H} = \hat{H}_q + \hat{H}_B + \hat{H}_{int}$$

$$\hat{H}_q = \frac{\hbar\omega_q}{2}\hat{\sigma}_z$$

$$\hat{H}_B = \hbar \sum_k \omega_k \hat{b}_k^\dagger \hat{b}_k$$

$$\hat{H}_{int} = \hbar\hat{\sigma}_x \sum_k g_k(t)\left(\hat{b}_k^\dagger \hat{b}_k\right),$$

where $\omega_q$ and $\omega_k$ are the angular frequencies of the qubit and the bath oscillators, respectively, $g_k(t)$ are the time-dependent coupling frequencies, $\hat{\sigma}_z=\hat{\sigma}_+\hat{\sigma}_--\hat{\sigma}_-\hat{\sigma}_+$ and $\hat{\sigma}_x=\hat{\sigma}_++\hat{\sigma}_-$ are the Pauli spin operators, and $\hat{\sigma}_-$ and $\hat{b}_k$ are the annihilation operators of the qubit and the bath oscillators, respectively.

In the interaction picture, the von Neumann equation for the density operator ρ of the combined system can be written as $$\frac{d\hat{\rho}}{dt} = -i\sum_k g_k(t)\left[\hat{\sigma}_x(t)\left\{\hat{b}_k^\dagger(t) + \hat{b}_k(t)\right\}, \hat{\rho}\right].$$

One can show the above equation iteratively. After one iteration step, one obtains $$\frac{d\hat{\rho}}{dt} = -i\sum_{k,k'} \int_0^t dt' g_k(t)g_{k'}(t')$$

$$\left[\hat{\sigma}_x(t)\hat{\sigma}_x(t')\hat{\rho}_q(t')\langle\hat{x}_k(t)\hat{x}_{k'}(t')\rangle_B - \hat{\sigma}_x(t)\hat{\rho}_x(t')\hat{\sigma}_x(t')\langle\hat{x}_k(t')\hat{x}_{k'}(t)\rangle_B - \hat{\sigma}_x(t')\hat{\rho}_q(t')\hat{\sigma}_x(t)\langle\hat{x}_k(t)\hat{x}_{k'}(t')\rangle_B + \hat{\rho}_q(t')\hat{\sigma}_x(t)\hat{\sigma}_x(t')\langle\hat{x}_k(t')\hat{x}_{k'}(t)\rangle_B\right],$$

where $\hat{x}_k=\hat{b}_k^\dagger+\hat{b}_k$ and $\langle\cdot\rangle_B=Tr_B(\cdot\hat{\rho}_B)$. In the following, the Markovian approximation is made, and it is assumed that $\hat{\rho}_q(t')\approx\hat{\rho}(t)$ throughout the whole integration. This can be justified by the fact that the two-time correlation function of the bath is non-zero only in the vicinity of t'=t, and decays very rapidly to zero for other times t'. Similarly, one can assume in the following that $g_k(t')\approx g_k(t)$. This means that the decoupling protocol is slow in the time scale given by the lifetime of the bath correlations. After these approximations, the derivation of the Lindblad equation is equivalent to the conventional case in which the coupling frequencies are constant.

After a secular approximation, one can obtain the Lindblad equation in the Schrödinger picture as $$\frac{d\hat{\rho}_q}{dt} = -\frac{i}{\hbar}\left[\hat{H}_q, \hat{\rho}_q\right] + \kappa(t)[1 + n(\omega_q)]D[\hat{\sigma}_-]\hat{\rho}_q + \kappa(t)n(\omega_q)D[\hat{\sigma}_+]\hat{\rho}_q,$$

where $$D[\hat{O}] = \hat{O}\hat{\rho}\hat{O}^\dagger - \frac{1}{2}\left\{\hat{O}^\dagger\hat{O}, \hat{\rho}\right\}.$$

Above, the time-dependent decay rate of the qubit is defined as $$\kappa(t) = f(t)^2\kappa(0),$$

where f(t) is defined above, and κ(0) is the value of the relaxation rate at the initial time of the protocol.

Figure 2:
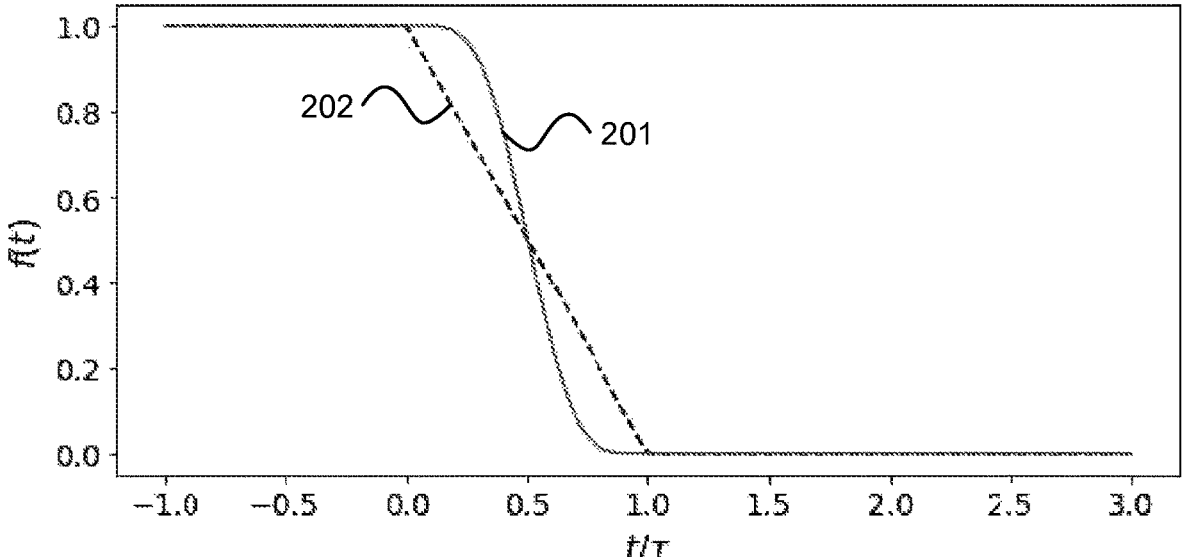
FIG. 2 illustrates a schematic representation of a coupling strength between at least one qubit and an energy dissipation structure according to an embodiment.

FIG. 2 illustrates a schematic representation of a coupling strength between the at least one qubit and the energy dissipation structure according to an embodiment.

One can recall that the decoupling f(t) protocol defined above $$f(t) = 1 + \sum_l^{l_{max}} \overline{\lambda}_l \left[ t - \frac{\tau}{2\pi l}\sin\left(\frac{2\pi l t}{\tau}\right) \right]$$

where τ is the duration of the decoupling protocol, and the following constraints should be fulfilled in order to obtain optimized decoupling:

$$\tau \sum_l^{l_{max}} \overline{\lambda}_l = -1,$$

$$\sum_l^{l_{max}} l^2 \overline{\lambda}_l = 0.$$

For the case $l_{max}=2$, one obtains $$\overline{\lambda}_1 = -\frac{4}{3\tau},$$

$$\overline{\lambda}_2 = \frac{1}{3\tau}.$$

Thus, the corresponding protocol can be written as $$f_2(t) = 1 - \frac{1}{3\tau}\left[3t - 4\frac{\tau}{2\pi}\sin\left(\frac{2\pi t}{\tau}\right) + \frac{\tau}{4\pi}\sin\left(\frac{4\pi t}{\tau}\right)\right]$$

-continued $$= 1 - \frac{t}{\tau} + \frac{2}{3\pi}\sin\left(\frac{2\pi t}{\tau}\right) + \frac{1}{12\pi}\sin\left(\frac{4\pi t}{\tau}\right).$$

In the embodiment of FIG. 2 a coupling strength 201 corresponding to the equation above and a linear coupling strength 202 are illustrated.

According to an embodiment, the coupling strength between the at least one qubit 101 and the energy dissipation structure 102 further comprises, during the decoupling period, a plurality of temporally sinusoidal components, wherein a period of each temporally sinusoidal component is less than or equal to a temporal length of the decoupling period.

For example, the sinusoidal components may be of the form $$\sin\left(\frac{2\pi lt}{\tau}\right),$$

where $\tau$ is the temporal length of the decoupling period.

According to an embodiment, the period of an lth sinusoidal component in the plurality of temporally sinusoidal components is $\tau/l$, wherein $\tau$ is the temporal length of the decoupling period.

For example, the lth sinusoidal components may be of the form $$\sin\left(\frac{2\pi lt}{\tau}\right),$$

where $\tau$ is the temporal length of the decoupling period.

According to an embodiment, the temporally linearly decreasing component decreases from a maximum value to substantially zero during the decoupling period.

For example, the linearly decreasing component can be of the form $$1 - \frac{t}{\tau}$$

if the maximum value of the linearly decreasing component is normalized to unity.

According to an embodiment, each sinusoidal component in the plurality of temporally sinusoidal components is substantially zero at a start of the decoupling period and substantially zero at an end of the decoupling period.

According to an embodiment, a time derivative of the coupling strength between the at least one qubit 101 and the energy dissipation structure 102 is substantially zero at a start of the decoupling period and at an end of the decoupling period.

The time derivative may refer to the first time derivative.

Thus, the coupling strength and the time derivative of the coupling strength may be continuous at the start and at the end of the decoupling period. This can minimize non-adiabatic error caused by the decoupling.

According to an embodiment, the coupling strength between the at least one qubit 101 and the energy dissipation structure 102 is temporally strictly decreasing during the decoupling period.

"Temporally strictly decreasing" means that the coupling strength is a temporally strictly decreasing function. Thus, $f(t_2)<f(t_1)$ for all $t_2>t_1$, where $t_1$ and $t_2$ are within the decoupling period.

According to an embodiment, the control unit 103 is further configured, after the reset period and before the decoupling period, perform a pre-decoupling using the control signal, wherein a magnitude of a time derivative of the coupling strength between the at least one qubit 101 and the energy dissipation structure 102 during the pre-decoupling is less than a magnitude of a time derivative of the coupling strength between the at least one qubit 101 and the energy dissipation structure 102 during the decoupling period.

For example, an average magnitude of a time derivative of the coupling strength during the pre-decoupling may be less than an average magnitude of a time derivative of the coupling strength the decoupling period. Alternatively or additionally, a maximum magnitude of a time derivative of the coupling strength during the pre-decoupling may be less than a maximum magnitude of a time derivative of the coupling strength the decoupling period. Alternatively or additionally, a maximum magnitude of a time derivative of the coupling strength during the pre-decoupling may be less than a minimum magnitude of a time derivative of the coupling strength the decoupling period.

The pre-decoupling can result in an improved fidelity (smaller initialization error). However, the speed (time derivative) of the pre-decoupling protocol may be small. Thus, the speed can be greater during the decoupling period, which can result in a greater initialization error. One can find an appropriate trade-off between the speed and accuracy of the reset by optimizing the durations of the different phases (reset, pre-decoupling, and decoupling).

FIG. 3 illustrates a schematic representation an energy dissipation structure comprising a superconductor-insulator-normal metal-insulator-superconductor junction according to an embodiment.

According to an embodiment, the energy dissipation structure 102 comprises at least one normal metal insulator-superconductor (NIS) junction.

According to an embodiment, the energy dissipation structure 102 comprises a quantum circuit refrigerator, QCR, wherein the QCR comprises a voltage-biased super-conductor 303-insulator 302-normal metal 301-insulator 302-superconductor 303 (SINIS) junction, and wherein the at least one qubit is electrically coupled to the normal metal 301 of the SINIS junction of the energy dissipation structure.

The control signal may correspond to a bias voltage over the NIS/SINIS junction.

According to an embodiment, the control unit 103 is configured to control the coupling strength between the at least one qubit and the energy dissipation structure by tuning a bias voltage of the SINIS junction of the energy dissipation structure based on the control signal.

According to an embodiment, the energy dissipation structure 102 is configured to dissipate photon energy transferred to the energy dissipation structure 102 via photon-assisted electron tunnelling in the NIS/SINIS junction.

Photon-assisted tunnelling involves a tunnelling process where the qubit excitation energy enables a tunnelling process which otherwise is not favourable due to an energy barrier of the NIS/SINIS junction. The barrier may be the superconducting energy gap of the NIS/SINIS junction, possibly accompanied by Coulomb gap depending on the charging energies.

In the embodiment of FIG. 7, the energy dissipation structure 102 comprises two NIS junctions. These two NIS junctions form a superconductor 303-insulator 302-normal metal 301-insulator 302-superconductor 303 (SINIS) junction. The SINIS junction may be biased by a bias voltage $V_B$ 304.

In this scheme, the at least one qubit 101 may be capacitively coupled to the QCR which can be seen as a thermal bath whose effective temperature and coupling strength to the at least one qubit 101 can be controlled with a bias voltage across the SINIS junction. The effective dissipation rate can be changed over several orders of magnitude which can allow for on-demand source of dissipation for rapid and accurate qubit reset. Strong dissipation results in fast decay to thermal equilibrium, where ideally the at least one qubit 101 is close to its ground state at low temperatures.

The energy relaxation properties of the SINIS junction can be controlled by the bias voltage $V_B$ 304. The SINIS junction may be referred to as a quantum circuit refrigerator (QCR). In some embodiments, the bias voltage $V_B$ 304 is time-dependent.

The at least one qubit 101 may be electromagnetically coupled to the SINIS junction of the energy dissipation structure 102. Thus, the energy relaxation structure 102 may absorb photon energy from the at least one qubit 101.

The energy dissipation structure 102 may absorb photons from the at least one qubit 101 at bias voltages where an electron needs to receive an additional energy quantum from the at least one qubit 101 to overcome the Bardeen-Cooper-Schrieffer (BCS) energy gap in the superconductor 303. For example, if $eV_B<2\Delta$, there is ideally only a small probability of electron tunnelling through the SINIS junction spontaneously. Moreover, if $eV_B+hf>2\Delta$, an electron can tunnel via photon-assisted tunnelling with the absorption of a photon of energy hf. Here $\Delta$ is the BCS gap or superconducting gap of the superconducting electrode material, $V_B$ is the bias voltage, e the electron charge, h the Planck constant, and f the frequency of the photon. If, furthermore, the energy hf corresponds to the energy difference of the excited and ground states of the qubit, the qubit is in its excited state, and if the SINIS junction is electromagnetically coupled to the qubit, the qubit can relax from the excited state to the ground state through the relaxation channel provided by the photon-assisted tunnelling in the SINIS junction. However, if $eV_B+hf<2\Delta$, the photon-assisted tunnelling is ideally forbidden. Thus, a time-dependent control signal $V_B$ can be used to control resetting of the at least one qubit 101.

FIG. 4 illustrates a schematic representation of a control unit 103 according to an embodiment.

The control unit 103 may comprise at least one processor 401. The at least one processor 401 may comprise, for example, one or more of various processing devices, such as a co-processor, a microprocessor, a digital signal processor (DSP), a processing circuitry with or without an accompanying DSP, or various other processing devices including integrated circuits such as, for example, an application specific integrated circuit (ASIC), a field programmable gate array (FPGA), a microprocessor unit (MCU), a hardware accelerator, a special-purpose computer chip, or the like.

The control unit 103 may further comprise a memory 402. The memory 402 may be configured to store, for example, computer programs and the like. The memory 402 may comprise one or more volatile memory devices, one or more non-volatile memory devices, and/or a combination of one or more volatile memory devices and non-volatile memory devices. For example, the memory 402 may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random (access memory), etc.).

The control unit 103 may further comprise other components not illustrated in the embodiment of FIG. 4. The control unit 103 may comprise, for example, an input/output bus for connecting the control unit 103 to other devices. Further, a user may control the control unit 103 via the input/output bus. The user may, for example, control quantum computation operations performed by the arrangement 100 via the control unit 103 and the input/output bus.

When the control unit 103 is configured to implement some functionality, some component and/or components of the control unit 103, such as the at least one processor 401 and/or the memory 402, may be configured to implement this functionality. Furthermore, when the at least one processor 401 is configured to implement some functionality, this functionality may be implemented using program code comprised, for example, in the memory.

The control unit 103 may be implemented using, for example, a computer, some other computing device, or similar.

FIG. 5 illustrates a flow chart representation of a method 1100 for resetting at least one qubit using an energy dissipation structure selectively couplable to the at least one qubit according to an embodiment.

The method 500 may comprise coupling 501 the at least one qubit to the energy dissipation structure for a reset period using a control signal, wherein the control signal controls a coupling strength between the at least one qubit and the energy dissipation structure.

The method 500 may further comprise, after the reset period, decoupling 502 the at least one qubit from the energy dissipation structure during a decoupling period using the control signal, wherein the coupling strength between the at least one qubit and the energy dissipation structure comprises, during the decoupling period, at least a temporally linearly decreasing component and at least one temporally sinusoidal component.

The method 500 may be performed by, for example, the control unit 103.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An arrangement for resetting at least one qubit, comprising:
  at least one qubit;
  an energy dissipation structure selectively couplable to the at least one qubit, wherein the energy dissipation structure is configured to dissipate energy transferred to the energy dissipation structure from the at least one qubit; and
  a control unit, configured to reset the at least one qubit by performing:
  couple the at least one qubit to the energy dissipation structure for a reset period using a control signal, wherein the control signal controls a coupling strength between the at least one qubit and the energy dissipation structure; and
  after the reset period, decouple the at least one qubit from the energy dissipation structure during a decoupling period using the control signal, wherein the coupling strength between the at least one qubit and the energy dissipation structure comprises, during the decoupling period, at least a temporally linearly decreasing component and at least one temporally sinusoidal component.

2. The arrangement according to claim 1, wherein the coupling strength between the at least one qubit and the energy dissipation structure further comprises, during the decoupling period, a plurality of temporally sinusoidal components, wherein a period of each temporally sinusoidal component is less than or equal to a temporal length of the decoupling period.

3. The arrangement according to claim 2, wherein the period of an lth sinusoidal component in the plurality of temporally sinusoidal components is $\tau/l$, wherein $\tau$ is the temporal length of the decoupling period.

4. The arrangement according to claim 2, wherein each sinusoidal component in the plurality of temporally sinusoidal components is substantially zero at a start of the decoupling period and substantially zero at an end of the decoupling period.

5. The arrangement according to claim 1, wherein the temporally linearly decreasing component decreases from a maximum value to substantially zero during the decoupling period.

6. The arrangement according to claim 1, wherein a time derivative of the coupling strength between the at least one qubit and the energy dissipation structure is substantially zero at a start of the decoupling period and at an end of the decoupling period.

7. The arrangement according to claim 1, wherein the coupling strength between the at least one qubit and the energy dissipation structure is temporally strictly decreasing during the decoupling period.

8. The arrangement according to claim 1, wherein the energy dissipation structure comprise at least one normal metal-insulator-superconductor, NIS, junction.

9. The arrangement according to claim 8, wherein the energy dissipation structure is configured to dissipate photon energy transferred to the energy dissipation structure via photon-assisted electron tunnelling in the NIS junction.

10. The arrangement according to claim 1, wherein the energy dissipation structure comprises a quantum circuit refrigerator, QCR, wherein the QCR comprises a voltage-biased superconductor-insulator-normal metal-insulator-superconductor, SINIS, junction, and wherein the at least one qubit is electrically coupled to the normal metal of the SINIS junction of the energy dissipation structure.

11. The arrangement according to claim 10, wherein the control unit is configured to control the coupling strength between the at least one qubit and the energy dissipation structure by tuning a bias voltage of the SINIS junction of the energy dissipation structure based on the control signal.

12. The arrangement according to claim 10, wherein the energy dissipation structure is configured to dissipate photon energy transferred to the energy dissipation structure via photon-assisted electron tunnelling in the SINIS junction.

13. The arrangement according to claim 1, wherein the at least one qubit comprises at least one superconductive qubit.

14. The arrangement according to claim 1, wherein the control unit is further configured, after the reset period and before the decoupling period, perform a pre-decoupling using the control signal, wherein a magnitude of a time derivative of the coupling strength between the at least one qubit and the energy dissipation structure during the pre-decoupling is less than a magnitude of a time derivative of the coupling strength between the at least one qubit and the energy dissipation structure during the decoupling period.

15. A quantum computing system comprising a plurality of arrangements according to claim 1.

16. A method for resetting at least one qubit using an energy dissipation structure selectively couplable to the at least one qubit, wherein the energy dissipation structure is configured to dissipate energy transferred to the energy dissipation structure from the at least one qubit, the method comprising:
  coupling the at least one qubit to the energy dissipation structure for a reset period using a control signal, wherein the control signal controls a coupling strength between the at least one qubit and the energy dissipation structure; and
  after the reset period, decoupling the at least one qubit from the energy dissipation structure during a decoupling period using the control signal, wherein the coupling strength between the at least one qubit and the energy dissipation structure comprises, during the decoupling period, at least a temporally linearly decreasing component and at least one temporally sinusoidal component.

* * * * *